US010425385B1

(12) United States Patent
Nagy et al.

(10) Patent No.: US 10,425,385 B1
(45) Date of Patent: Sep. 24, 2019

(54) DUAL MOTHERBOARD CONFIGURATION DATA TRANSPORT APPLIANCE

(71) Applicant: Amazon Technologies, Inc., Seattle, WA (US)

(72) Inventors: Bianca Nagy, Redmond, WA (US); Frank Charles Paterra, Kirkland, WA (US); Christopher Strickland Beall, Woodinville, WA (US); Darin Lee Frink, Lake Tapps, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 126 days.

(21) Appl. No.: 15/279,313

(22) Filed: Sep. 28, 2016

(51) Int. Cl.
  *G11B 33/02* (2006.01)
  *H04L 29/06* (2006.01)
  *G11B 33/14* (2006.01)
  *G11B 33/08* (2006.01)
  *G06F 1/3203* (2019.01)

(52) U.S. Cl.
  CPC ........ *H04L 63/0281* (2013.01); *G06F 1/3203* (2013.01); *G11B 33/022* (2013.01); *G11B 33/08* (2013.01); *G11B 33/142* (2013.01); *H04L 63/166* (2013.01)

(58) Field of Classification Search
  CPC .. G01F 25/0046; G01F 25/0053; G01G 17/04
  See application file for complete search history.

(56) References Cited

U.S. PATENT DOCUMENTS

| | | | | |
|---|---|---|---|---|
| 6,395,976 | B1* | 5/2002 | Koradia | H05K 7/1409 174/359 |
| 6,661,654 | B2* | 12/2003 | Felcman | G06F 1/184 361/679.4 |
| 2002/0089818 | A1* | 7/2002 | Chen | G06F 1/181 361/679.02 |
| 2008/0037209 | A1* | 2/2008 | Niazi | G06F 1/181 361/727 |
| 2013/0198384 | A1* | 8/2013 | Kirsch, II | G06F 15/161 709/226 |
| 2013/0250549 | A1* | 9/2013 | Park | F21L 4/02 362/97.1 |
| 2015/0277515 | A1* | 10/2015 | Farrow | G06F 1/187 361/679.58 |

* cited by examiner

*Primary Examiner* — Mohammed Waliullah
(74) *Attorney, Agent, or Firm* — Thomas | Horstemeyer, LLP; Michael J. D'Aurelio; Jason M. Perilla

(57) ABSTRACT

A data transport computing device includes a housing, a drive bay framing assembly including an upper platform bracket and a lower platform bracket, a first computing board mounted to an upper surface of the upper platform bracket, and a second computing board mounted to a lower surface of the lower platform bracket. The first computing board is secured between the upper platform bracket and front, rear, and top sides of the housing, and the second computing board is secured between the lower platform bracket and the front side, rear, and bottom sides of the housing. Data storage drives are mounted between the upper and lower platform brackets. In operation, the second computing board encrypts data from a customer and transmits the encrypted data to the first computing board over a network cable within the housing, and the first computing board writes the encrypted data to the data storage drives.

20 Claims, 9 Drawing Sheets

US 10,425,385 B1

DUAL MOTHERBOARD CONFIGURATION DATA TRANSPORT APPLIANCE

BACKGROUND

Computer networks and distributed computing arrangements have spurred a range of cloud-computing services. The cloud-computing services can be viewed as flexible, on-demand computing platforms. Cloud-computing services can operate from nearly any geographic region with network connectivity. Examples of cloud-computing services include elastic cloud computing and simple cloud storage. Using specialized software packages, cloud-computing services can also provide various types of networking, database, analytics, application services, deployment, management, developer, Internet of things (IoT), and other tools. Cloud-computing services can be leveraged to provide relatively large and scalable computing capacity and storage faster and at less cost than building a server farm from the ground up.

BRIEF DESCRIPTION OF THE DRAWINGS

Many aspects of the present disclosure can be better understood with reference to the following drawings. The components in the drawings are not necessarily drawn to scale, with emphasis instead being placed upon clearly illustrating the principles of the disclosure. Moreover, in the drawings, like reference numerals designate corresponding parts throughout the several views.

DETAILED DESCRIPTION

Figure 1:
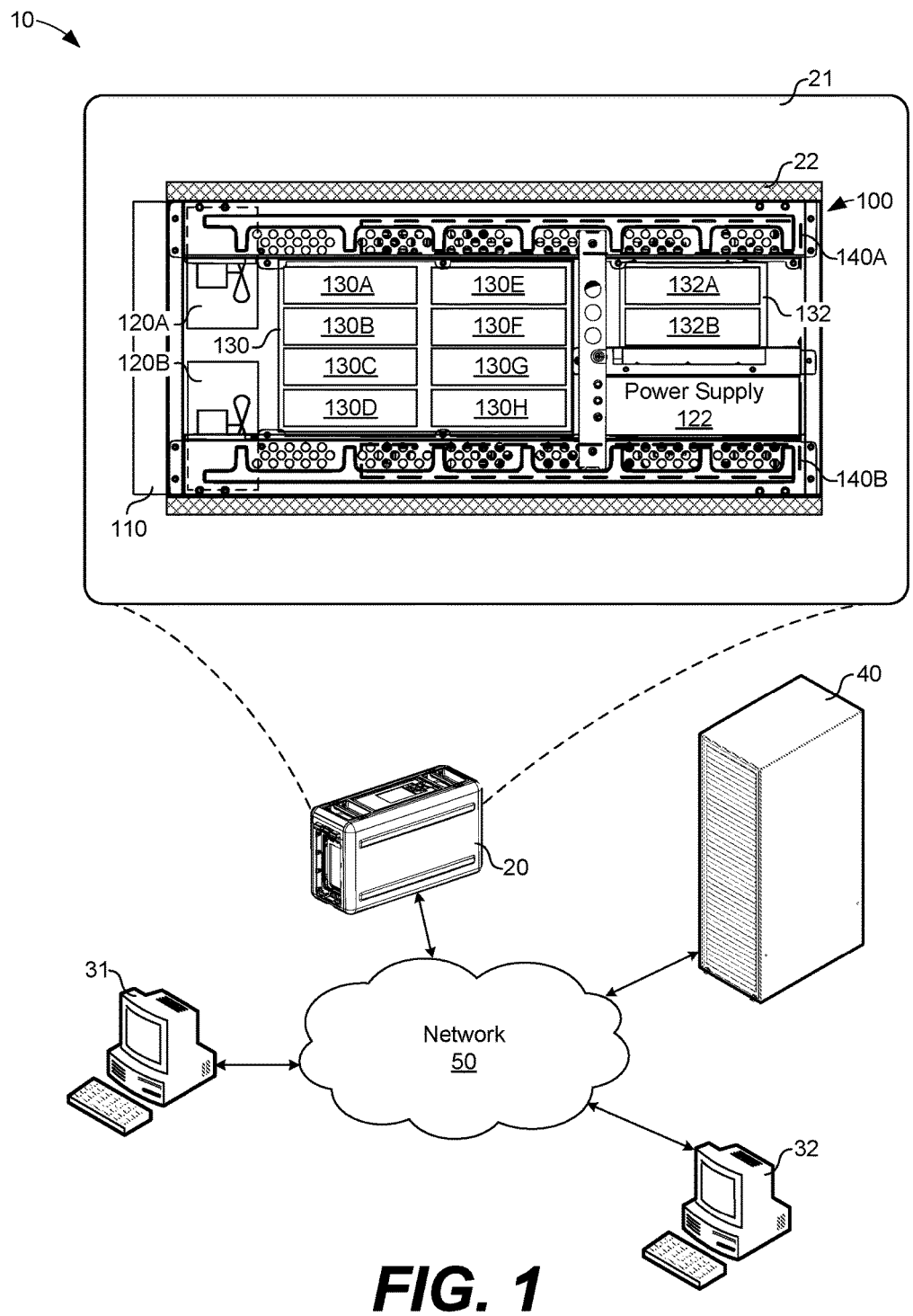
FIG. 1 illustrates a networked environment including a representative data transport device according to various example embodiments described herein.

As noted above, computer networks and distributed computing arrangements have spurred a range of cloud-computing services. Cloud-computing services can be leveraged to provide relatively large and scalable computing capacity and storage faster and at less cost than to build a server farm from the ground up. In some cases, however, the lack of sufficient computer network bandwidth between local computing devices and the computing devices of cloud-computing services can hinder the ability to use cloud-computing services. For example, it can be relatively time consuming and cumbersome to transfer large amounts of data (e.g., especially tens or hundreds of gigabytes, terabytes, or even petabytes of data) from local to geographically dislocated computing devices of cloud-computing services over computer networks because of intermittent bandwidth, connectivity, and other network-related issues.

In the context of the problem outlined above, the embodiments described herein are directed to a configuration of various computing components in a data transport computing device or appliance. The new configuration of the components includes the arrangement of two motherboards mounted on upper and lower platform brackets of an internal drive bay framing assembly with a number of data storage drives mounted between the upper and lower platform brackets. The first motherboard or computing board is mounted to an upper surface of the upper platform bracket, and the second motherboard or computing board is mounted to a lower surface of the lower platform bracket. In the new configuration, the first computing board is secured in a space between the upper platform bracket and the front, rear, and top sides of the housing, and the second computing board is secured in a space between the lower platform bracket and the front side, rear, and bottom sides of the housing. The data storage drives for storing customer data are mounted between the upper and lower platform brackets. The new configuration provides a robust, compact, and space-saving arrangement of the components in the data transport computing device while still permitting airflow for cooling and accessibility for maintenance.

In operation, the second computing board encrypts data received from a customer and transmits the encrypted data to the first computing board over a network cable within the housing, and the first computing board writes and reads the encrypted data to and from the data storage drives. By incorporating the second computing board into the data transport computing device, the encryption processes that were previously performed by computing devices of the customer before data was transferred to the data transport computing device can be performed within the data transport computing device itself. At the same time, those encryption processes are separated from the first computing board which is communicatively coupled to the second computing board only by a network cable within the data transport computing device.

The data transport computing device can be shipped to the location of and interconnected with the computing infrastructure of a customer. Once installed locally, the customer can use a client application to designate data for transfer to and storage on the data transport computing device. Afterwards, the data transport computing device can be shipped back to the computing infrastructure location of a cloud-services provider, and the data can be copied off the data transport computing device, to the computing infrastructure of the cloud-services provider, and deleted from the data transport computing device.

The data transport computing device offers a very-large-scale data transport solution using secure appliances that can transfer large amounts of data into and out of computing infrastructures of the cloud-services providers. The use of one or more data transport computing devices to transfer data can solve some of the most common challenges with large-scale data transfers, including high network costs, long transfer times, and security concerns. Even with high-speed Internet connections, it can take months to transfer large amounts of data. For example, 100 terabytes of data can take more than 100 days to transfer over a dedicated 100 megabit per second connection. On the other hand, the transfer of 100 terabytes of data can be accomplished in less than one day, plus shipping time, using one or two data transport computing devices. The data transport computing devices can also incorporate multiple layers of security to protect data, including tamper-resistant enclosures, strong encryption, and a Trusted Platform Module (TPM) to ensure security.

Turning to the figures for additional context, FIG. 1 illustrates a networked environment 10 including a data transport device 20 according to various example embodiments described herein. The networked environment 10 also includes computing devices 31 and 32, among others, and a number of server computers 40 communicatively coupled to each other and to the data transport device 20 over the network 50. The networked environment 10 shown in FIG. 1 is representative of one type of computing environment or infrastructure in which the data transport device 20 (or similar devices) can be used to store data for transportation to another location or network.

When installed for data transfer, the data transport device 20 need not be communicatively coupled to the network 50 in all cases. Instead, the data transport device 20 can be directly coupled to another computing device, such as one of the computing devices 31 and 32, among others, or one of the server computers 40 using a network cable. Additionally, any number of data transport devices similar to the data transport device 20 can be installed at one location and stacked in some cases. Further, the data transport device 20 can be installed in upright (as shown in FIG. 1) or horizontal (e.g., on its side) positions. Thus, while various components in the data transport device 20 are distinguished among each other using descriptive terms such as upper, lower, front, back, etc., those terms are intended to offer a spatial frame of reference of the relative positions of the components but should not be considered limiting of the potential orientations of the data transport device 20.

Before turning to the components of the data transport device 20, the other components in the networked environment 10 are described briefly. The computing devices 31 and 32 can be embodied as any suitable computing devices or processor-based device or system, including those embodied in the form of a desktop computer, a laptop computer, or a tablet computer, among other example computing devices and systems. The computing devices 31 and 32 can also include one or more subsystems and/or peripheral devices. For example, the peripheral devices may include one or more input devices, such as a keyboard, keypad, touch pad, touch screen, microphone, scanner, mouse, joystick, camera, one or more buttons, etc.

The server computers 40 can include one or more web servers, application servers, and other server computers. In various cases, the server computers 40 can be located at a single installation site or distributed among different geographical locations. The server computers 40 (and the computing devices 31 and 32) can also be embodied in part as various functional or logical elements (e.g., executed computer-readable instructions, logic circuitry, processing circuitry, etc.) executed to direct them to perform certain data processing, data transfer, and other activities.

The network 50 can include the Internet, intranets, extranets, wide area networks (WANs), local area networks (LANs), wired networks, wireless (e.g., cellular, 802.11-based (WiFi), bluetooth, etc.) networks, cable networks, satellite networks, other suitable networks, or any combinations thereof. The data transport device 20, computing devices 31 and 32, and server computers 40 are communicatively coupled to each other over the network 50. The data transport device 20, computing devices 31 and 32, and server computers 40 can communicate with each other over the network 50 using any suitable systems interconnect models and/or protocols. Although not illustrated, the network 150 can include connections to any number of network hosts, such as website servers, file servers, networked computing resources, databases, data stores, or any other network or computing architectures.

Among other components described in further detail below, the data transport device 20 includes an outer case 21 and a shock-insulative encasement 22 fitted (e.g., placed, wrapped, secured, etc.) around at least a portion of an inner housing 100. The housing 100 encloses various components of a specially-designed computing device as described in further detail below. The outer case 21 can be formed from any suitable plastics, metals, rubbers, or other materials and provides the outer protective shell of the data transport device 20. The outer case 21 is designed as the outer packaging of the housing 100, and the data transport device 20 can be shipped without additional packaging surrounding the outer case 21.

Within the outer case 21, the shock-insulative encasement 22 surrounds at least a portion of the housing 100. The shock-insulative encasement 22 can be embodied as any suitable type of shock-insulative material, such as air or air bags, sponge, foam, or other materials or combinations of materials. In various embodiments, the shock-insulative encasement 22 can be formed in any number (and size) of pieces, such as halves, quarters, corners, etc., to surround or cover various portions of the housing 100. The shock-insulative encasement 22 helps to avoid mechanical shocks to the data transport device 20 during transport.

As shown in FIG. 1, the data transport device 20 includes a front panel 110. As described in further detail below, the front panel 110 includes a display screen to control and monitor the status and certain operating aspects of the data transport device 20. A fan 120A and a fan 120B (collectively "fans 120") are mounted to a front side of a chassis of the housing 100. The fans 120 can be used to either force or draw air across the components within the housing 100. Among others, those components include a power supply 122, a multi-drive module 130 including data storage drives 130A-130H, a multi-drive module 132 including data storage drives 132A-132B, a computing board 140A, and a computing board 140B.

The computing board 140A is mounted to (and hidden behind) an upper platform bracket of a drive bay framing assembly in the housing 100. Because the computing board 140A is hidden behind the upper platform bracket in FIG. 1, it is designated by a hidden or dashed line in FIG. 1. The computing board 140A is also shown in FIGS. 3, 4, and 6C-E. A computing board 140B is mounted to (and hidden behind) a lower platform bracket of the drive bay framing assembly in the housing 100. Because the computing board 140B is hidden behind the lower platform bracket in FIG. 1, it is also designated by a hidden line in FIG. 1. The computing board 140B is also shown in FIGS. 6C-E.

The arrangement of the fans 120, power supply 122, multi-drive modules 130 and 132, and computing boards 140A and 140B within the housing 100 provides a robust, compact, and space-saving arrangement. The arrangement includes a relatively large number of data storage drives with two motherboards and a power supply while still permitting sufficient separation space for cooling airflow and accessibility for maintenance. In the housing 100, the components are mounted to and separated by a drive bay framing assembly. The drive bay framing assembly is shown in FIGS. 3, 4, and 6A-6E and described in further detail below.

Figure 2A:
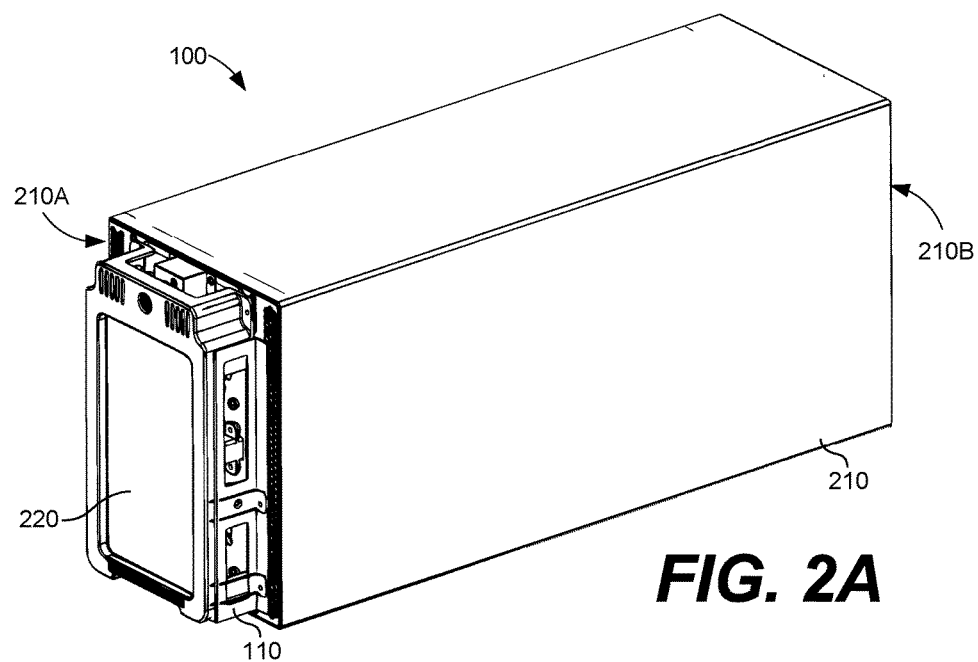
FIG. 2A illustrates a perspective view of a housing of a representative data transport device according to various example embodiments described herein.
Figure 2B:
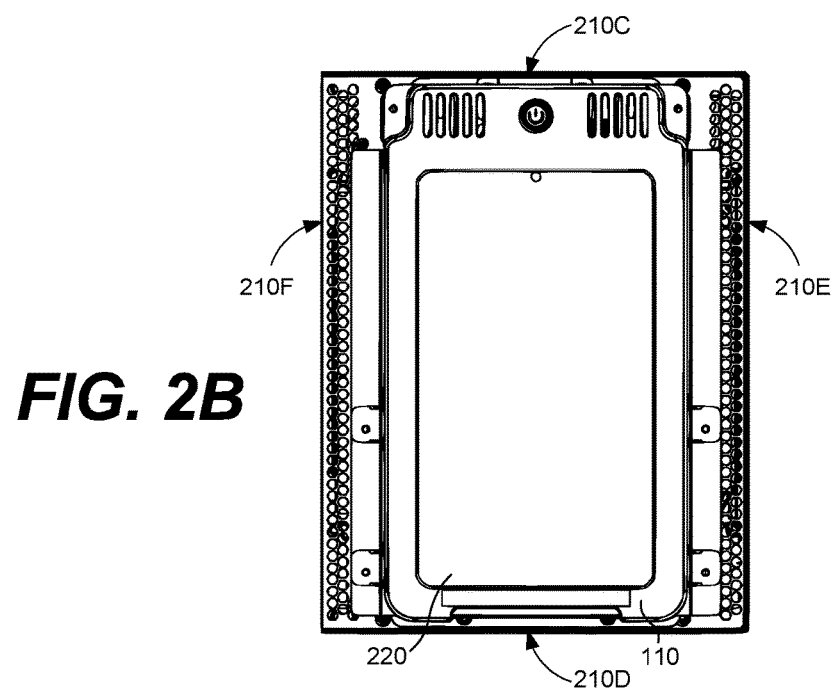
FIG. 2B illustrates a front view and display of the housing shown in FIG. 2A according to various example embodiments described herein.

Before turning to FIGS. 2A and 2B, it is noted that the components in the drawings are not necessarily drawn to scale, with emphasis instead on clearly illustrating the principles of the disclosure. The embodiments are not limited to any particular arrangement of the components shown. Instead, the embodiments encompass suitable variations on the arrangement shown. As one example, the relative positions of the multi-drive modules, data storage drives, the power supply, and other components between the upper and lower platform brackets can vary as compared to that shown. One or more of the multi-drive modules or data storage drives in the multi-drive modules can be omitted in some cases, and the embodiments are not limited to any particular type or types of data storage drives. Additionally, descriptive terms such as upper, lower, front, back, etc., are intended to offer a spatial frame of reference of the relative positions of the components shown in the figures but should not be considered limiting of the potential orientations of the data transport device 20.

FIG. 2A illustrates a perspective view of a housing 100 of the data transport device 20 shown in FIG. 1, and FIG. 2B illustrates a front view and front panel 110 of the housing 100 shown in FIG. 2A. The housing 100 includes a chassis cover 210 and chassis described in further detail below with reference to FIG. 3. Between the chassis and the chassis cover 210, the housing 100 includes six faces or sides, including the front side 210A, the rear side 210B, the top side 210C, the bottom side 210D, the right side 210E, and the left side 210F. The chassis and the chassis cover 210 can be formed from any material(s), including suitable types of rolled sheet metals (e.g., aluminum, steel, etc.), plastics, glass, wood, or other materials or combinations thereof.

The front panel 110 includes a display 220. The display 220 can be embodied as any suitable type of display device, such as electronic ink, liquid crystal, organic light emitting diode, or other display device, with or without a capacitive or other touch subsystem interface. Although not shown in FIG. 1, 2A, or 2B, the data transport device 20 can include additional displays on other sides and one or more covers for the front side 210A and the rear side 210B.

Figure 3:
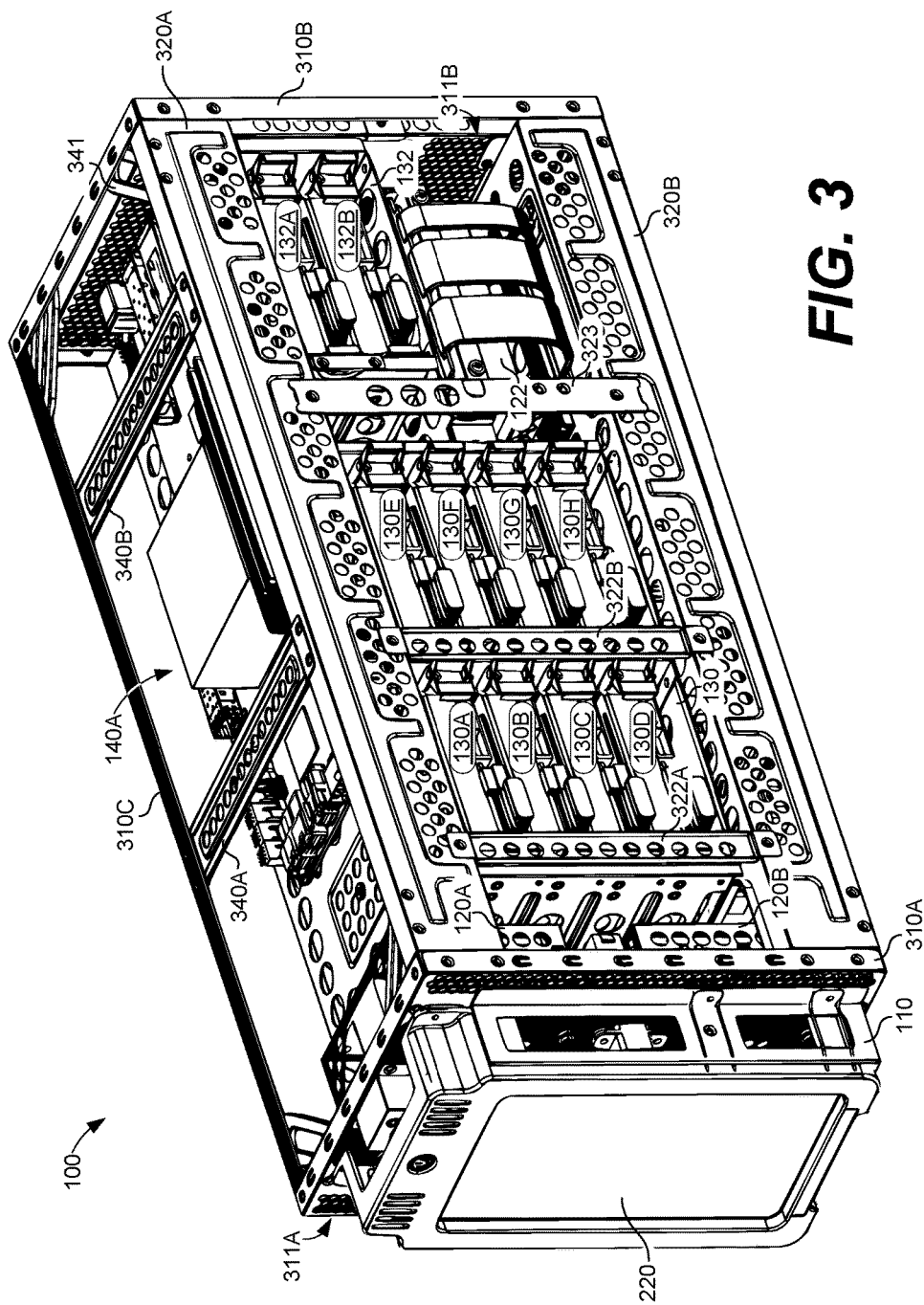
FIG. 3 illustrates a perspective view of the housing of the data transport device shown in FIG. 2A with its cover removed according to various example embodiments described herein.

FIG. 3 illustrates a perspective view of the housing 100 of the data transport device shown in FIG. 2A with the chassis cover 210 removed. Various components can be seen within the housing 100 in FIG. 3, including the fans 120, the power supply 122, the multi-drive module 130 including the data storage drives 130A-130H, the multi-drive module 132 including the data storage drives 132A-132B, and the computing board 140A. The computing board 140B is not visible in the view shown in FIG. 3.

As shown in FIG. 3, the chassis includes a front sidewall 310A, a rear sidewall 310B, and a left sidewall 310C. The chassis cover 210 can be secured around the chassis (i.e., around the top, bottom, and right sides) using removable fasteners such as screws or other fasteners or permanently secured with rivets or other fasteners.

Figure 4:
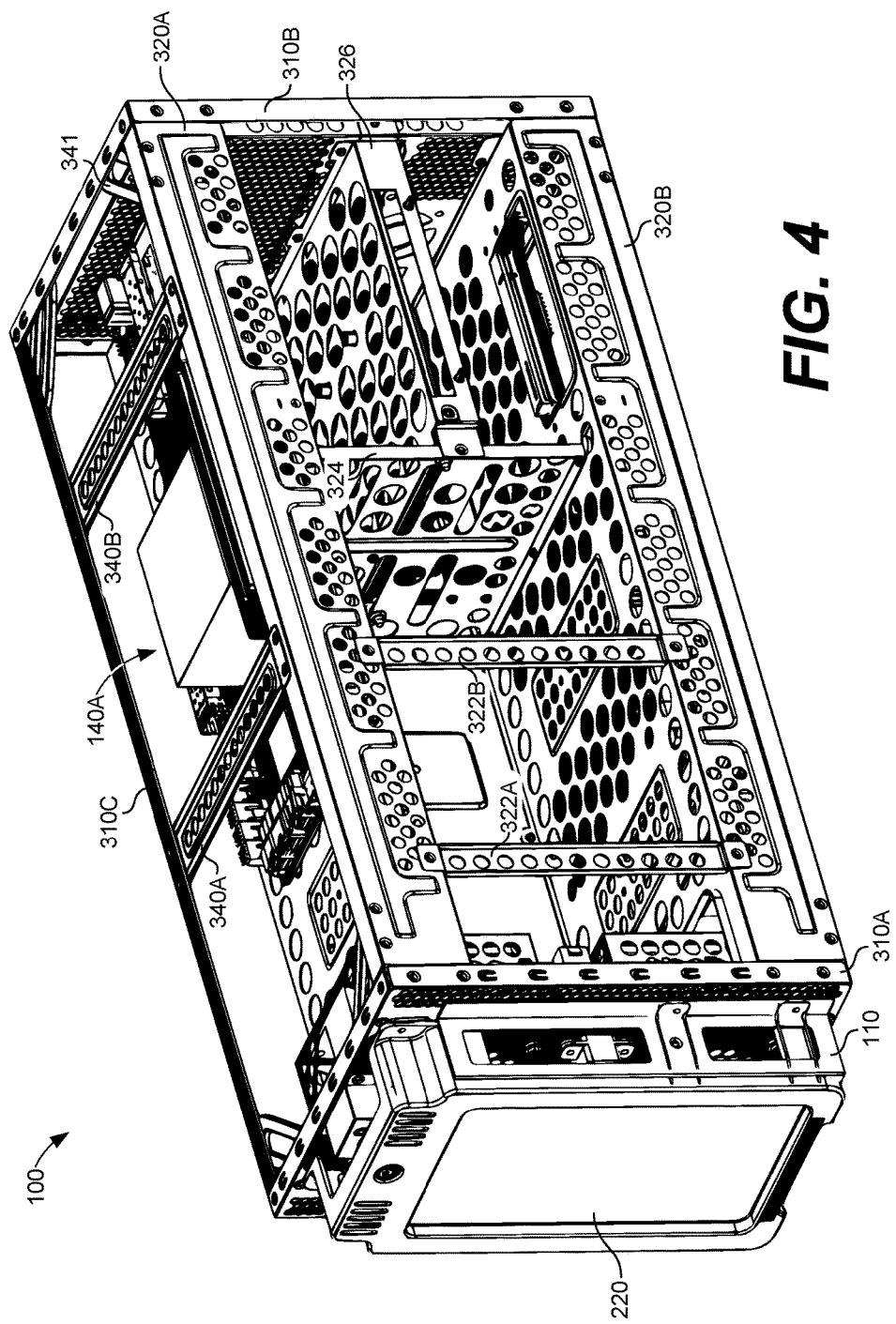
FIG. 4 illustrates a perspective view of the housing of the data transport device shown in FIG. 2A with its drive modules and power supply removed according to various example embodiments described herein.

A drive bay framing assembly within the housing 100 is used to separate, mount, and secure components of the data transport device 20 within the housing 100. The drive bay framing assembly includes an upper platform bracket 320A and a lower platform bracket 320B that both extend from the front sidewall 310A to the rear sidewall 310B. The drive bay framing assembly also includes other dividers and platforms to separate the drive bay space between the upper platform bracket 320A and the lower platform bracket 320B. For example, although mostly hidden in FIG. 3, the drive bay framing assembly also includes a drive bay divider bracket between the multi-drive module 130 and the multi-drive module 132 and a mid-bay platform between the power supply 122 and the multi-drive module 132. An example of the drive bay divider and the mid-bay platform are shown in FIG. 4 and described below.

For strength, the housing 100 includes a number of additional supports, including the vertically extending brackets 322A and 322B that extend between the upper platform bracket 320A and the lower platform bracket 320B, and the laterally extending brackets 340A and 340B that extend between the upper platform bracket 320A and the left sidewall 310C of the chassis. Additionally, the housing 100 includes corner support straps 341 at the corners of the sidewalls 310A, 310B, and 310C. Although not shown, the housing 100 can include laterally extending brackets that extend between the lower platform bracket 320B and the left sidewall 310C of the chassis on the bottom of the housing 100 and corner support straps at the corners at the bottom of the housing 100. FIG. 3 also illustrates the cabling strap 323. The cabling strap 323 can be relied upon to route and/or secure cables within the housing 100.

The upper platform bracket 320A, lower platform bracket 320B, the other parts of the drive bay framing assembly described below, the vertically extending brackets 332A and 332B, the laterally extending brackets 332A and 332B, and the corner support straps 341 can be formed from any suitable material or combination of materials, including rolled sheet metals (e.g., aluminum, steel, etc.), plastics, glass, wood, or other materials. The parts of the drive bay framing assembly (and associated supports) can be secured together in any suitable manner using screws, rivets, mechanical interferences, adhesives, ties, wire, or other fasteners or fastening means.

The fans 120 can be used to either force or draw air across the power supply 122, the data storage drives 130A-130H and 132A-132B, the computing board 140A, and the computing board 140B. Using the fans 120, air can be drawn in through the front air apertures 311A in the front sidewall 310A, forced over the components in the housing 100, and expelled out the rear air apertures 311B in the rear sidewall 310B. Otherwise, air can be drawn in the rear air apertures 311B and expelled out the front air apertures 311A.

With the chassis cover 210 removed in FIG. 3, it is clear how the computing board 140A is secured in the space between the upper platform bracket 320A, the front sidewall 310A, the rear sidewall 310B, and the top of the chassis cover 210. Similarly, the computing board 140B (not shown in FIG. 3) is secured in the space between the lower platform bracket 320B, the front sidewall 310A, the rear sidewall 310B, and the top of the chassis cover 210. As better shown in FIGS. 6C and 6D, the computing board 140A is mounted to an upper surface of the upper platform bracket 320A and the computing board 140B is mounted to a lower surface of the lower platform bracket 320B. The upper surface of the upper platform bracket 320A faces away from the lower surface of the lower platform bracket 320B such that the memory modules and processors of the computing board 140A and the computing board 140B face and extend away from each other in the housing 100.

Although not shown in FIG. 3, the computing and data storage components in the housing 100 can be communicatively coupled together using any serial or parallel interface cables, such as AT attachment, serial AT attachment (SATA), eSATA, aSATAp, mSATA, universal serial bus (USB), small computer systems interface (SCSI), twisted pair network cable, or other cables. In one embodiment, the computing board 140A includes an SATA cable connection to each of the data storage drives 130A-130H and 132A-130B (although any suitable type of cable can be used), and the computing board 140B is not directly connected to any data storage drives in the housing 100.

The computing board 140A and the computing board 140B include quad small form-factor pluggable (QSFP) transceivers for data communications between them. An additional network cable is provided in the housing 100 between the computing boards 140A and 140B for data communications between them at data rates as high as 4×28 Gbit/s (i.e., QSFP28), for example, among other data rates. Another externally-available QSFP interface connection on the computing board 140B is available for connecting to another computing device, computer network, or computing environment, such as the computing environment 10 shown in FIG. 1.

In operation, a customer can plug a network cable into the externally-available QSFP interface connection (or other network interface) of the computing board 140B to transfer data to the data transport device 20. As the computing board 140B receives data, it encrypts the data and transmits it to the computing board 140A over the QSFP interface connection between the computing boards 140A and 140B. In turn, the computing board 140A writes the encrypted data to the data storage drives 130A-130H and 132A-130B. By incorporating the computing board 140B into the data transport device 20, it is not necessary for customers to encrypt data before transferring it to the data transport device 20. The computing board 140A offers a secure, trusted platform for data encryption inside the housing 100. The computing board 140A can also be used to perform certain cloud-computing services for additional flexibility.

In one embodiment, the computing board 140B is configured to receive data, encrypt the data, and transmit the encrypted data to the computing board 140A but is not configured to store the data either before or after it is encrypted. The computing board 140B may not even be connected or have access to a data storage drive, such as a non-volatile memory data drive, to store received and/or encrypted data. On the other hand, the computing board 140A includes an SATA cable connection to each of the data storage drives 130A-130H and 132A-130B.

FIG. 4 illustrates a perspective view of the housing 100 shown in FIG. 2A with the chassis cover 210, power supply 122, and multi-drive modules 130 and 132 removed. Additional parts of the drive bay framing assembly are shown in FIG. 4. Along with the upper and lower platform brackets 320A and 320B, the drive bay framing assembly also includes a drive bay divider bracket 324 and a mid-bay platform 326. The drive bay divider bracket 324 extends vertically between the upper and lower platform brackets 320A and 320B. The mid-bay platform 326 extends laterally between the drive bay divider bracket 324 and the rear sidewall 310B.

Referring between FIGS. 3 and 4, it can be seen how the drive bay divider bracket 324 separates the multi-drive modules 130 and 132 and the mid-bay platform 326 supports the multi-drive module 132 over the power supply 122. In addition to supporting the multi-drive module 132 over the power supply 122, the mid-bay platform 326 can also provide an area to mount and secure a breakout card for the computing board 140B.

In other configurations, one or both of the drive bay divider bracket 324 and the mid-bay platform 326 can be secured at different locations in the drive bay framing assembly. For example, although the divider bracket 324 is shown positioned closer to the rear sidewall 310B than the front sidewall 310A in FIG. 4, the divider bracket 324 can be located closer to the front sidewall 310A in other embodiments. Similarly, the mid-bay platform 326 can be positioned higher or lower between the upper and lower platform brackets 320A and 320B. In other cases, one or both of the drive bay divider bracket 324 and the mid-bay platform 326 can be duplicated or omitted in certain embodiments.

Figure 5:
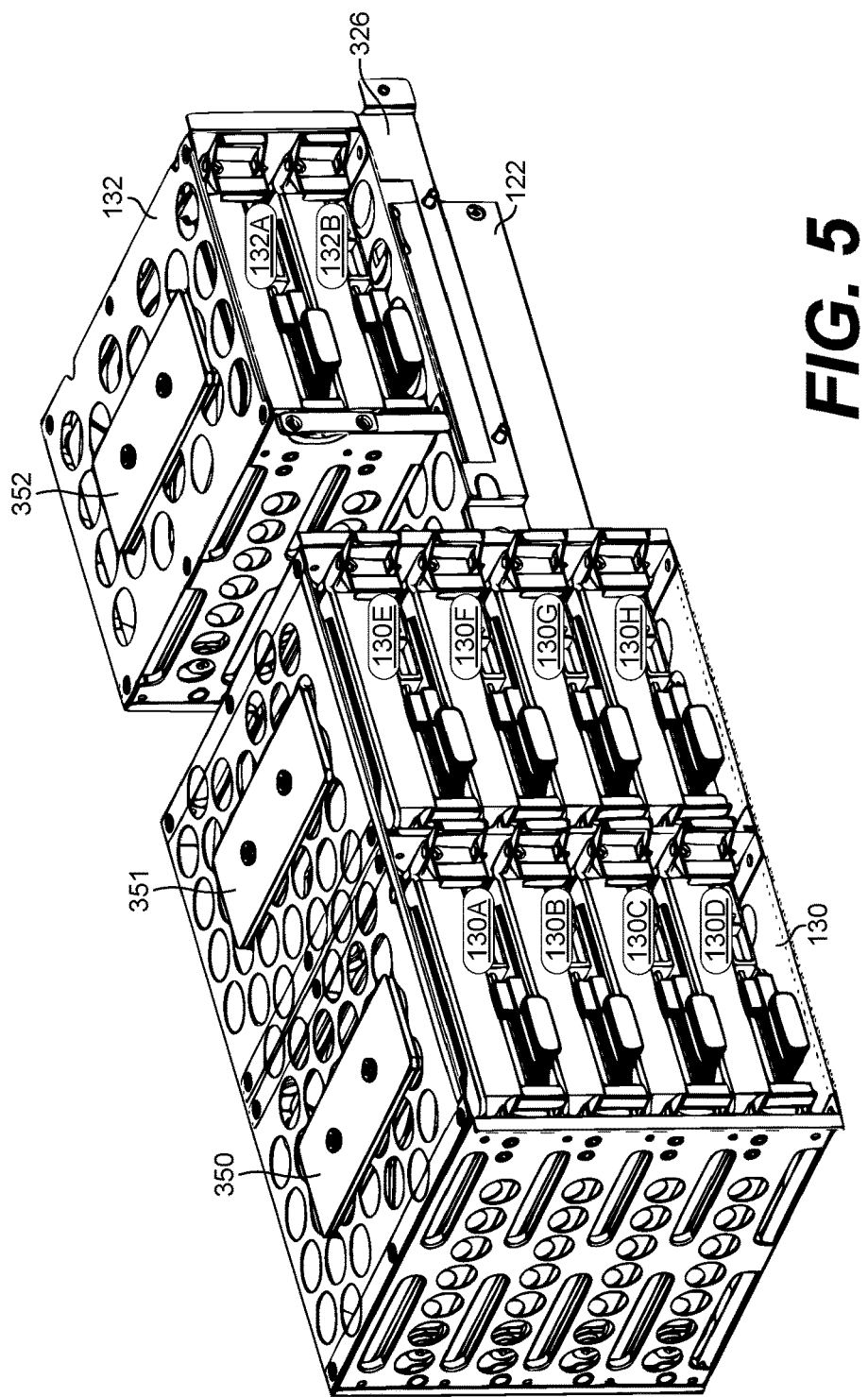
FIG. 5 illustrates a perspective view of the drive modules and power supply in the data transport device shown in FIG. 2A according to various example embodiments described herein.

FIG. 5 illustrates a perspective view of the multi-drive modules 130 and 132 and the power supply 122. As shown in FIG. 5, the multi-drive module 130 provides an enclosure for the data storage drives 130A-130H, and the multi-drive module 132 provides an enclosure for the data storage drives 132A-132B. The multi-drive modules 130 and 132 can be formed from any suitable material or combination of materials, including rolled sheet metals (e.g., aluminum, steel, etc.), plastics, glass, wood, or other materials. As shown in FIG. 5, the multi-drive modules 130 and 132 can include a number of openings, holes, or apertures to permit airflow around the data storage drives 130A-130H and 132A-132B.

The data storage drives 130A-130H can be secured within the multi-drive module 130 using drive mounting brackets or other hardware. In some cases, the data storage drives 130A-130H can be secured using within the multi-drive module 130 using mounts formed of rubber or other shock-absorbing materials. Similarly, the data storage drives 132A-132B can be secured within the multi-drive module 132 using drive mounting brackets or other hardware including, in some cases, rubber or other shock-absorbing materials. The multi-drive modules 130 and 132 can be secured between the upper platform bracket 320A and lower platform bracket 320B using screws, rivets, mechanical interferences, adhesives, ties, wire, or other fasteners or fastening means. The spacers 350-352 can be formed from any suitable materials and provide clearance between the top of the multi-drive modules 130 and 132 and the upper platform bracket 320A. In some cases, the spacers 350-352 can be formed from shock-absorbing materials, such as rubber, to reduce mechanical shock. Additionally, although not shown in FIG. 5, spacers can be inserted between the bottom of the multi-drive modules 130 and 132 and the lower platform bracket 320B.

The power supply 122 can be embodied as any suitable power supply unit (PSU) that converts mains AC to low-voltage regulated DC power. In that context, the power supply 122 can include a switched mode or regulated linear power converter. In one embodiment, the power supply 122 can conform to the advanced technology extended (ATX) or similar specification and provide +3.3V, +5V, +12V, and −12V voltage outputs, although other specifications and output voltages can be used.

Figure 6A:
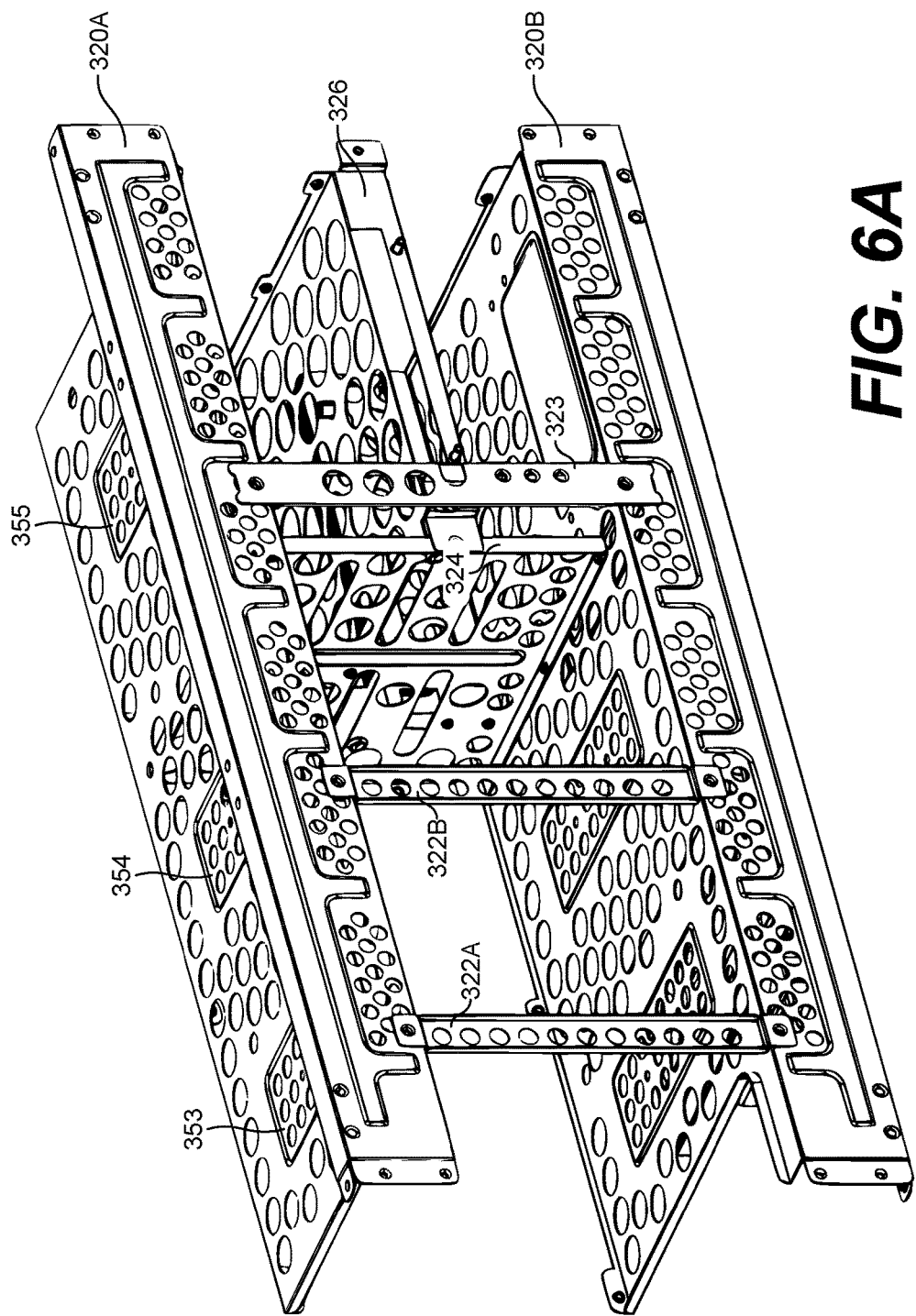
FIG. 6A illustrates a perspective view of the drive bay framing assembly in the data transport device shown in FIG. 2A according to various example embodiments described herein.
Figure 6B:
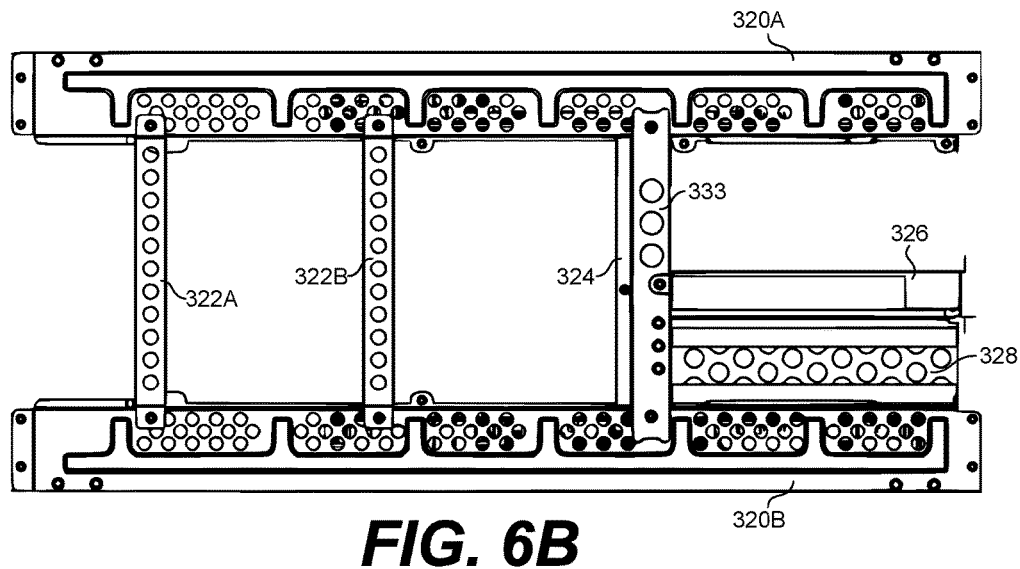
FIGS. 6B and 6C illustrate right and left side views, respectively, of the drive bay framing assembly in the data transport device shown in FIG. 2A according to various example embodiments described herein.
Figure 6C:
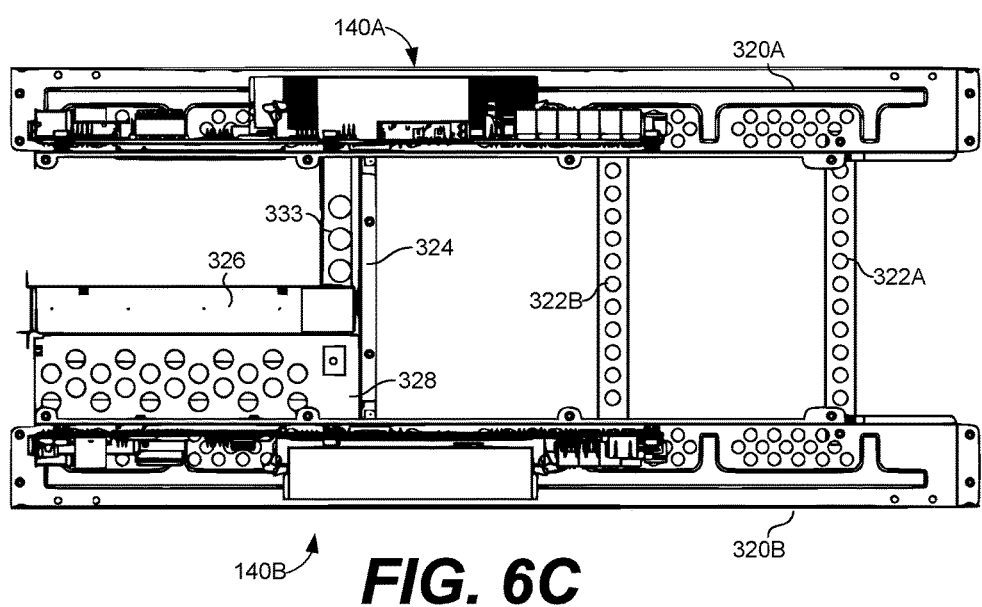
Figure 6D:
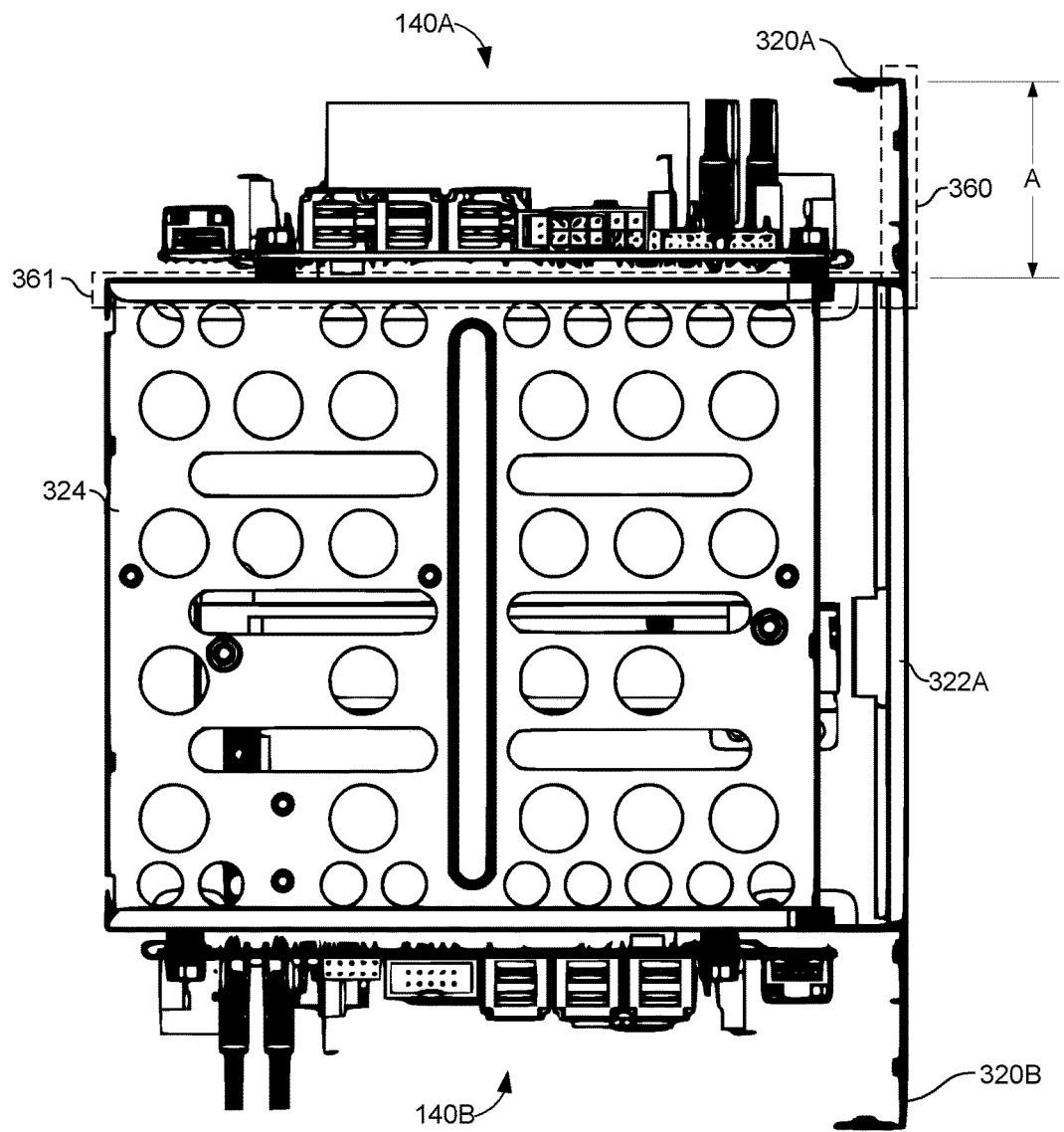
FIGS. 6D and 6E illustrate side and top-down views, respectively, of the drive bay framing assembly in the data transport device shown in FIG. 2A according to various example embodiments described herein.
Figure 6E:
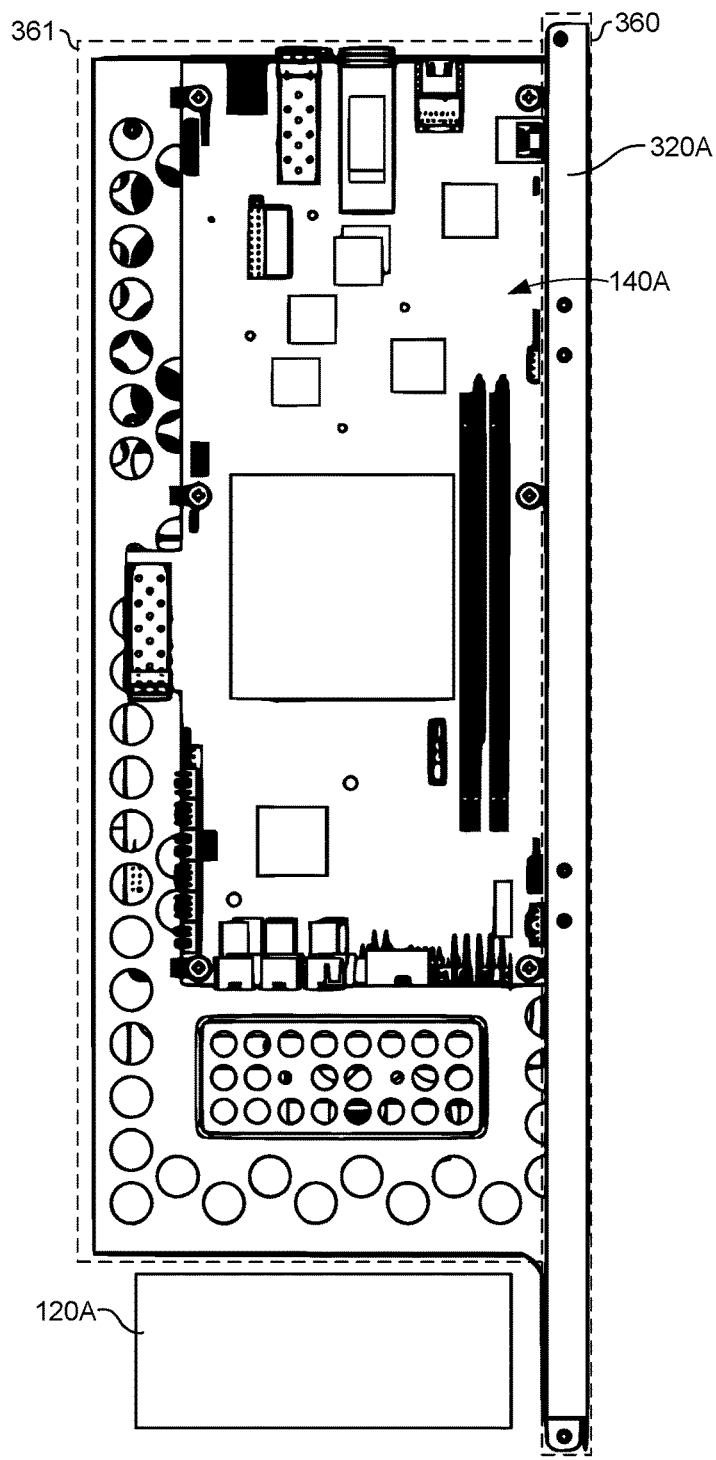

FIG. 6A illustrates a perspective view of the drive bay framing assembly, FIGS. 6B and 6C illustrate right and left side views, respectively, of the drive bay framing assembly, and FIGS. 6D and 6E illustrate front side and top-down views, respectively, of the drive bay framing assembly. The view in FIG. 6A is similar to that shown in FIG. 4, but without the front sidewall 310A, rear sidewall 310B, and left sidewall 310C of the chassis being shown. In FIGS. 6C-6E, one or both of the computing boards 140A and 140B are also shown secured to the drive bay framing assembly.

Spacer depressions 353-355 are also shown in the upper platform bracket 320A in FIG. 6A. When assembled, the spacers 350-352 (see FIG. 5) are aligned with the spacer depressions 353-355. Fasteners, such as screws or rivets, can be inserted through apertures in the spacer depressions 353-355 and into the spacers 350-352 to secure the multi-drive modules 130 and 132 to the upper platform bracket 320A. Depressions similar to the spacer depressions 353-355 can also be formed in the lower platform bracket 320B to secure the multi-drive modules 130 and 132 to the lower platform bracket 320A.

In FIGS. 6B and 6C, a riser wall 328 is shown. The riser wall 328 extends between the mid-bay platform 326 and the lower platform bracket 320B. The power supply 122 can be secured on one side against the riser wall 328. Particularly, the power supply 122 (see FIGS. 3 and 5) can be secured against the side of the riser wall 328 shown in FIG. 6B, and the side of the riser wall 328 shown in FIG. 6C faces the left sidewall 310C of the chassis.

In FIG. 6C, both the computing boards 140A and 140B are shown. The computing board 140A is secured to the upper platform bracket 320A, and the computing board 140B is secured to the lower platform bracket 320B. More particularly, the computing board 140A is mounted to an upper surface of the upper platform bracket 320A, the computing board 140B is mounted to a lower surface of the lower platform bracket 320B, and the upper surface of the upper platform bracket 320A faces away from the lower surface of the lower platform bracket 320A.

The computing board 140A can be embodied as a printed circuit board (PCB), such as a computer motherboard, including one or more processors, processor chipsets, memory modules, power converters, and/or other components directly mounted or indirectly mounted to the PCB using sockets. Similarly, the computing board 140B can be embodied as PCB, such as a computer motherboard, including one or more processors, processor chipsets, memory modules, power converters, and/or other components directly mounted or indirectly mounted to the PCB using sockets.

The computing boards 140A and 140B are mounted to the upper platform and lower platform brackets 320A and 320B, respectively, facing away from each other as shown in FIG. 6C. In other words, the larger components of the computing board 140A, such as the processors, memory modules, etc., are mounted on one major surface of the PCB of the computing board 140A, and another major surface of the PCB of the computing board 140A faces the upper surface of the upper platform bracket 320A. The larger components of the computing board 140B, such as the processors, memory modules, etc., are mounted on one major surface of the PCB of the computing board 140B, and another major surface of the PCB of the computing board 140B faces the lower surface of the lower platform bracket 320B. In that configuration, the computing boards 140A and 140B face away from each other as they are mounted to the upper platform and lower platform brackets 320A and 320B, respectively.

It can also be seen in FIG. 6D how the computing boards 140A and 140B face away from each other as they are mounted to the upper platform and lower platform brackets 320A and 320B, respectively. In FIG. 6D, the riser edge 360 and platform 361 portions of the upper platform bracket 320A are separately designated. The riser edge 360 extends vertically from one edge or end of the platform 361 in a direction substantially perpendicular to the platform surface of the platform 361. The height "A" of the riser edge 360 is selected to provide sufficient space for the computing board 140A between the platform 361 and the top side 210C (see FIGS. 2A and 2B) of the cover 210. The lower platform bracket 320B also includes platform and riser edge portions as shown in FIG. 6D.

In FIG. 6E, the position of the fan 120A is shown in relation to the upper platform bracket 320A. The riser edge 360 extends further than the platform 361 of the upper platform bracket 320A. In the housing 100, the riser edge 360 extends from the front side 210A to the rear side 210B (see FIGS. 2A and 2B) of the chassis, while the platform 361 does not fully extend to the front side 210A to permit space for the fan 120A.

As used herein, "extends" or "extends to" should be interpreted to mean extends proximate to or extends to contact. Disjunctive language, such as the phrase "at least one of X, Y, or Z," unless specifically stated otherwise, is to be understood with the context as used in general to present that an item, term, etc., can be either X, Y, or Z, or any combination thereof (e.g., X, Y, and/or Z). Thus, such disjunctive language is not generally intended to, and should not, imply that certain embodiments require at least one of X, at least one of Y, or at least one of Z to be each present.

It should be emphasized that the above-described embodiments are merely examples to set forth an understanding of the principles and concepts of the disclosure. Many variations and modifications can be made to the above-described embodiment(s) without departing substantially from the spirit and principles of the disclosure. All such modifications and variations are intended to be included herein within the scope of this disclosure and protected by the following claims.

Therefore, at least the following is claimed:
1. A computing device, comprising:
   a chassis that forms a first number of sides, including a front side and a rear side, of a housing for the computing device;
   a chassis cover that forms a second number of sides, including a top side and a bottom side, of the housing for the computing device;
   a drive bay framing assembly comprising:
      an upper platform bracket that extends from the front side to the rear side of the housing;
      a lower platform bracket that extends from the front side to the rear side of the housing; and
      a drive bay divider bracket that extends between and separates the upper platform bracket and the lower platform bracket;
   a multi-drive module secured between the upper platform bracket and the lower platform bracket;
   a first computing board mounted to the lower platform bracket in a first space between the lower platform bracket and the front side, the rear side, and the bottom side of the housing; and
   a second computing board mounted to the upper platform bracket in a second space between the upper platform bracket and the front side, the rear side, and the top side of the housing.
2. The computing device of claim 1, wherein:
   the first computing board comprises a processor configured to receive data, encrypt the data on the first computing board, and transmit the encrypted data to the second computing board over a network cable within the housing; and the second computing board comprises a processor configured to receive the encrypted data over the network cable and read and write the encrypted data to one or more of a plurality of drives in the multi-drive module.

3. The computing device of claim 1, wherein:
the multi-drive module comprises a plurality of multi-drive modules;
a first of the plurality of multi-drive modules is secured between the upper platform bracket, the lower platform bracket, and a first side of the drive bay divider bracket; and
a second of the plurality of multi-drive modules is secured between the upper platform bracket, the lower platform bracket, and a second side of the drive bay divider bracket.

4. The computing device of claim 1, further comprising:
a power supply secured between the upper platform bracket and the lower platform bracket;
a first fan positioned to force air into the first space and a third space between the upper platform bracket and the lower platform bracket; and
a second fan positioned to force air into the second space and the third space between the upper platform bracket and the lower platform bracket.

5. The computing device of claim 1, further comprising:
a shock-insulative encasement fitted around at least a portion of housing; and
a shipping case fitted around at least a portion of the shock-insulative encasement.

6. A computing device, comprising:
a housing;
a drive bay framing assembly comprising a first platform bracket and a second platform bracket;
a first computer motherboard mounted to the first platform bracket in a first space between the first platform bracket and a front side, a rear side, and a bottom side of the housing;
a second computer motherboard mounted to the second platform bracket in a second space between the second platform bracket and the front side, the rear side, and a top side of the housing; and
a drive secured within the drive bay framing assembly in a third space between the first platform bracket, the second platform bracket, the front side, and the rear side of the housing, the drive being secured between the first computer motherboard mounted to the first platform bracket and the second computer motherboard mounted to the second platform bracket.

7. The computing device of claim 6, wherein:
the first computer motherboard is mounted to a lower surface of the first platform bracket;
the second computer motherboard is mounted to an upper surface of the second platform bracket; and
the upper surface of the second platform bracket faces away from the lower surface of the first platform bracket.

8. The computing device of claim 7, wherein:
the first computer motherboard comprises a first printed circuit board having a first processor and a first memory module mounted to a first surface of the first printed circuit board;
a second surface opposing the first surface of the first printed circuit board faces the lower surface of the first platform bracket;
the second computer motherboard comprises a second printed circuit board having a second processor and a second memory module mounted to a first surface of the second printed circuit board; and
a second surface opposing the first surface of the second printed circuit board faces the upper surface of the second platform bracket.

9. The computing device of claim 6, wherein:
the second platform bracket comprises an upper platform tray that extends from a right side to a left side of the housing and an upper riser that extends substantially perpendicular from the upper platform tray to the top side of the housing; and
the first platform bracket comprises a lower platform tray that extends from the right side to the left side of the housing and a lower riser that extends substantially perpendicular from the lower platform tray to the bottom side of the housing.

10. The computing device of claim 9, wherein the upper riser and the lower riser extend from the front side to the rear side of the housing.

11. The computing device of claim 6, further comprising a drive bay divider bracket that extends between and separates the first platform bracket and the second platform bracket.

12. The computing device of claim 11, wherein:
the drive comprises a plurality of drives;
a first of the plurality of drives is secured between the first platform bracket, the second platform bracket, and a first side of the drive bay divider bracket; and
a second of the plurality of drives is secured between the first platform bracket, the second platform bracket, and a second side of the drive bay divider bracket.

13. The computing device of claim 6, further comprising a power supply secured between the first platform bracket and the second platform bracket.

14. The computing device of claim 6, further comprising:
a first fan positioned to force air into the first space and the third space between the first platform bracket and the second platform bracket; and
a second fan positioned to force air into the second space and the third space between the first platform bracket and the second platform bracket.

15. The computing device of claim 14, further comprising:
a shock-insulative encasement fitted around at least a portion of the housing; and
a shipping case fitted around at least a portion of the shock-insulative encasement.

16. A computing device, comprising:
a housing;
a drive bay framing assembly comprising a first platform bracket and a second platform bracket;
a first computer motherboard mounted to a lower surface of the first platform bracket in a first space between the first platform bracket and a front side, a rear side, and a bottom side of the housing;
a second computer motherboard mounted to an upper surface of the second platform bracket in a second space between the second platform bracket and the front side, the rear side, and a top side of the housing; and
a drive secured within the drive bay framing assembly in a third space between the first platform bracket, the second platform bracket, the front side, and the rear side of the housing, the drive being secured between the first computer motherboard mounted to the first platform bracket and the second computer motherboard mounted to the second platform bracket, wherein:

the upper surface of the second platform bracket faces away from the lower surface of the first platform bracket.

17. The computing device of claim 16, wherein:

the second platform bracket comprises an upper platform tray that extends from a right side to a left side of the housing and an upper riser that extends substantially perpendicular from the upper platform tray to the top side of the housing; and the first platform bracket comprises a lower platform tray that extends from the right side to the left side of the housing and a lower riser that extends substantially perpendicular from the lower platform tray to the bottom side of the housing.

18. The computing device of claim 17, wherein the upper riser and the lower riser extend from the front side to the rear side of the housing.

19. The computing device of claim 16, wherein the drive comprises a plurality of drives secured between the first platform bracket and the second platform bracket.

20. The computing device of claim 16, further comprising a power supply secured between the first platform bracket and the second platform bracket.

\* \* \* \* \*